United States Patent [19]

Hansen

[11] 4,304,424
[45] Dec. 8, 1981

[54] RAPID INSTALLATION FITTING FOR PLAIN END PIPE

[75] Inventor: Arne H. Hansen, Doylestown, Pa.

[73] Assignee: Meyertech Corporation, Lakewood, Colo.

[21] Appl. No.: 27,791

[22] Filed: Apr. 6, 1979

[51] Int. Cl.³ .............................................. F16L 17/02
[52] U.S. Cl. .................................. 285/111; 285/156; 285/382; 285/404; 411/393
[58] Field of Search ................ 285/404, 90, 382, 111, 285/156; 85/1 SS; 403/362; 411/393

[56] References Cited

U.S. PATENT DOCUMENTS

| Number | Date | Name | Class |
|---|---|---|---|
| 268,686 | 12/1882 | Kaiser. | |
| 333,353 | 12/1885 | Smith. | |
| 839,947 | 1/1907 | McCluskey. | |
| 929,858 | 8/1909 | Johnson. | |
| 971,794 | 10/1910 | Scott. | |
| 1,330,792 | 2/1920 | Frick | 85/1 SS |
| 1,831,856 | 11/1931 | Fullman | 285/404 |
| 1,930,194 | 10/1933 | Dillon. | |
| 2,235,435 | 3/1941 | Koester | 85/1 SS |
| 2,462,910 | 3/1949 | Simmons | 85/1 SS X |
| 3,286,754 | 11/1966 | Klooz et al. | 85/1 SS X |
| 3,342,088 | 9/1967 | Smith. | |
| 3,349,792 | 10/1967 | Larkin. | |
| 3,428,075 | 2/1969 | Wagner. | |
| 3,462,021 | 8/1969 | Hawke et al. | 285/404 X |
| 3,477,750 | 11/1969 | Powell. | |
| 3,480,036 | 11/1969 | Ehrens et al.. | |
| 3,572,778 | 3/1971 | Cassel. | |
| 3,686,747 | 8/1972 | Bagnulo. | |
| 3,817,271 | 6/1974 | Roven. | |
| 3,822,074 | 7/1974 | Welcker. | |
| 3,838,205 | 9/1974 | Kish. | |
| 3,920,060 | 11/1975 | Heldmann et al. | 85/1 SS X |
| 4,018,246 | 4/1977 | Langstroth. | |
| 4,067,353 | 1/1978 | De Hoff. | |
| 4,165,892 | 8/1979 | Piatek et al. | 285/404 X |

FOREIGN PATENT DOCUMENTS

| Number | Date | Country | Class |
|---|---|---|---|
| 6146 | of 1912 | United Kingdom | 285/404 |
| 1729 | of 1914 | United Kingdom | 285/404 |
| 648504 | 1/1951 | United Kingdom | 85/1 SS |
| 712389 | 7/1954 | United Kingdom | 85/1 SS |
| 960664 | 6/1964 | United Kingdom | 285/404 |
| 991719 | 5/1965 | United Kingdom | 285/404 |

OTHER PUBLICATIONS

Victaulic, I-18, Installation and Assembly Instructions, Apr. 1978.

*Primary Examiner*—Thomas F. Callaghan
*Attorney, Agent, or Firm*—Fishburn, Gold and Litman

[57] ABSTRACT

A fitting for connection to a metal plain end pipe includes a generally cylindrical sleeve section sized to receive and cradle a pipe end portion, an annular seal in the sleeve section for forming a liquid tight connection between the pipe end portion and the fitting, and a screw cutter member extensible into the sleeve section for locking the pipe end portion to the fitting. An end surface of the cutter member has an annular ring of projecting cutting elements having intersecting faces forming metal cutting edges, each cutting element being respectively spaced from another cutting element by transverse recesses for relief of chips cut from the pipe. The cutting edges each have a rake angle configuration relative to the pipe end portion such that a limited cutting penetration is achieved under a predetermined pressure range and travel speed along a pipe end surface. The cutter member advances longitudinally and simultaneously rotates into cutting engagement with the pipe end portion faster than the ability of the cutting elements to cut, thereby simultaneously cutting and pushing the pipe end portion into snug engagement with the sleeve section.

9 Claims, 6 Drawing Figures

RAPID INSTALLATION FITTING FOR PLAIN END PIPE

Pipe sections joined together to form a line or run of pipe for flow of fluids therethrough must be free from leakage and, accordingly, considerable care must be employed in selecting a fitting which will properly form joints or couples beween adjacent sections of pipe and which will securely grip and maintain the pipe in a straight, leak-free relationship. Problems of pipe connection become particularly apparent in regard to building sprinkler systems for controlling fires, wherein joined sections of pipe must be straight and aligned with individual pipe sections prevented from twisting and longitudinally separating with respect to adjacent pipe sections and fittings spaced therealong. The problems are compounded when sprinkler heads are connected by a substantial drop length to Tee fittings, for relativey small amounts of twisting will result in a sprinkler head deviating considerably from desired orientation, leading to an improper pattern of water droplet distribution.

In order to reduce costs of installation, pipe connections should be accomplished as quickly and efficiently as possible. The use of plain end pipe facilitates such rapid installation twofold; first, time is not spent threading cut ends of pipe and second, the pipe ends need not be rotatably inserted into a threaded coupling. Where plain end pipe is used, joints usually may be more readily accomplished and couples, such as Tees, quickly positioned in a desired orientation for receiving the sprinkler head drop.

The principal objects of the present invention are: to provide a fitting for plain end pipe which easily and quickly connects adjacent pipe ends in end-to-end or confronting relation along a straight line; to provide such a fitting which effectively prevents both twisting and longitudinal separation of the pipe relative to the fitting under high stress; to provide such a fitting having a seal for fluid-tight engagement with a plain end pipe and which includes an abutment member limiting intrusion of the pipe; to provide such a fitting having a cutter member securing an end portion of the pipe therein; to provide such a fitting wherein the cutter member cooperates with screw threads advancing same faster than the ability of the cutter member to cut, thereby both cuttingly penetrating a significant amount into a pipe end surface and pushing the pipe end portion into snug transverse engagement with the fitting; and to provide such a plain end fitting which is inexpensive to manufacture, simple to install, durable in use, and is particularly well adapted for its proposed use.

Other objects and advantages of this invention will become apparent from the following description taken in connection with the accompanying drawings wherein are set forth, by way of illustration and example, certain embodiments of this invention.

Figure 1:
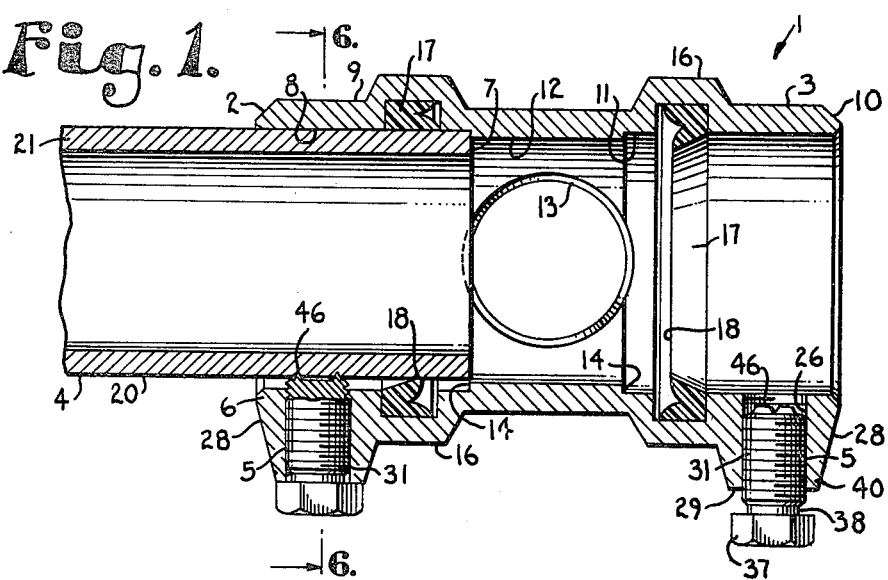
FIG. 1 is a longitudinal cross-sectional view of a plain end pipe fitting embodying the present invention and having a pipe end portion secured therein.

As required, detailed embodiments of the invention are disclosed herein, however, it is understood that the embodiments are merely exemplary of the invention which may be embodied in many forms that are different from the illustrative embodiments. Therefore, specific structural and functional details disclosed herein are not to be interpreted as limiting but merely as a basis for the claims defining the scope of this invention. In this regard, it is to be recognized that this invention may be embodied in many variations of pipe couplings or fittings, such as Tees, caps, and the like, adapted for receiving an end portion of a plain end pipe and this disclosure is presented only as a representative basis for teaching one skilled in the art to variously employ the present invention in virtually any appropriately detailed structure.

Referring more in detail to the drawings:

The reference numeral 1 generally designates a plain end pipe fitting or coupling embodying the present invention and having opposed sleeve or socket sections 2 and 3 sized to receive pipe plain end portions, such as an end portion 4, in substantially confronting or end-to-end abutment. The sleeve sections 2 and 3 have respective screw cutters 5 extending through a wall 6 thereof for engagement with the pipe end portion 4 and preventing twisting movement and longitudinal separation of the pipe relative to the fitting 1.

The fitting 1 includes means for effecting a secure supporting grip and a leak-free seal with at least one pipe end. In the illustrated example, FIGS. 1 and 6, the fitting 1 is in the form of a tee for connecting secondary lines, such as sprinkler head drops to end-to-end pipe sections, although it is within the concept of this invention to employ the inventive concept with other conduit fitting forms such as end-to-end couples, caps, angles, and the like. The fitting 1 is particularly useful in fire fighting sprinkler systems wherein a great number of relatively short lengths of pipe are utilized.

The pipe end portion 4 is plain end; that is, the end is of the same diameter as the body of the pipe and has no threads, lugs, grooves or other special connecting arrangements. Therefore, a pipe can be merely cut to a desired length and the fitting 1 rapidly installed on the end thereof, thereby facilitating fast job completion and reduced labor costs compared to threaded couples and other complex connecting arrangements. The fitting 1 and the pipe to be connected thereto are constructed of steel, cast iron or like suitable material, the pipe normally being manufactured in industry standard diameters. The sleeve sections 2 and 3 are appropriately sized to receive the pipe ends. For example, drawn steel pipe commonly used in fire sprinkler installations is manufactured in one inch and one and one-half inch outside diameters and have a wall thickness of from about 0.085 to about 0.145 inch. In the illustrated example, the cylindrical sleeve sections 2 and 3 have inside diameters sized slightly larger than the outside dimension of the pipe, such as from 0.030 to 0.040 inch larger, to easily receive the pipe end portion 4 while permitting the cradling and transverse deformation thereof into a slightly oval shape, as described below.

The exemplary sleeve members 2 and 3 each have an inner surface 8 and an exterior surface 9 with outer ends 10 of the sleeve sections doubly chamfered to reduce edge chipping and promote ease of pipe end insertion. Sleeve sections 2 and 3 include respective inner ends 11 adjacent a tubular inner section 12 for fluid communication between the sleeve sections 2 and 3 and, in the illustrated example, an outlet or passage 13 extends radially from the inner section 12 to form a Tee configuration. The respective inner ends 11 terminate in respective outwardly facing, annular shoulders 14 providing an abutment surface for a pipe end edge 7 to limit intrusion of a respective pipe end portion 4.

Enlarged annular housings 16 positioned intermediately of the outer end 10 and the inner end 11 in each of the sleeve sections 2 and 3 provide recesses accommodating annular seals 17 of suitable elastomeric material such as Buna "S" rubber, Buna "N" rubber, natural rubber or well-known flexible synthetics such as polyurethane, Hypalon or Viton, the latter two being Du Pont Corporatin (Wilmington, Del.) trademarks respectively for chloro-sulfonated polyethylene and polyvinylidiene-hexchloropropylene. The exemplary seals 17 have radially inner beads 18 extending toward the inner section 12 for interferably engaging an outside surface 20 of the pipe end portion 4 with a compressive force and forming a fluid-tight connection between the pipe end portion 4 and the fitting 1.

The sleeve members 2 and 3 each include a longitudinally advanceable, rotary cutter member or screw cutter 5. In the illustrated example, the cutter members or screw cutters 5 are threadedly engaged within a threaded bore 26 extending through the wall 6 radially toward the longitudinal axis of the respective sleeve section for substantially perpendicular engagement with the outside surface 20 of a pipe end wall 21, although it is within the concept of this invention that the screw cutters 5 could advance at an angle into the sleeve sections 2 and 3 which does not intersect said longitudinal axis, so long as the intersection between the screw cutter 5 and the pipe surface 20 is not excessively oblique. The wall 6, in this example, has an outwardly extending tapered shoulder portion 28 surrounding the bore 26 with an annular end surface 29.

Figure 2:
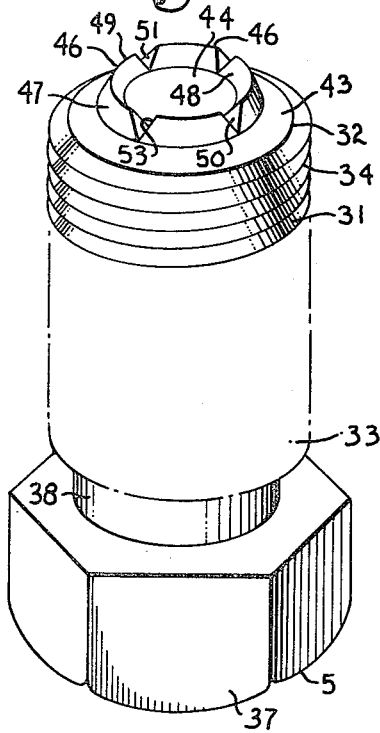
FIG. 2 is an enlarged, perspective view of a screw cutter of the pipe fitting and showing details thereof.

As shown in FIG. 2, each screw cutter 5 includes a shaft 31 having opposite ends 32 and 33 with threads 34 therebetween engageable with threads 35 in the bore 26. In a preferred embodiment, the threads 34 and 35 are formed at 20 per inch on a ⅜ inch diameter shaft, so that one complete revolution of the shaft 31, or 360° of turn, causes the screw cutter 5 to advance in the bore 26 approximately 1/20th of an inch. The end 33 includes an appropriate member facilitating rotation of the shaft 31, such as a hexagonal head 37 adapted for engagement with a wrench (not shown). As discussed further below, in the ready-to-use condition, the head 37 is spaced from the shoulder end surface 29 a distance so that two full turns, or 1/10th of an inch of advancement, occurs before the surface 29 engages and prevents further advancement of the screw cutter 5. A groove 38 may space the head 37 from the threads 34 and an indentation or stake 40 on the exterior of the shoulder portion 28 is desirable to prevent the screw cutter 5 from moving out of the ready-to-use position in the bore 26 during transit and handling.

An end surface 43 on the shaft end 32 has an annular ring of cutting element 46 thereon formed of a material having sufficient hardness to function as a metal cutter. The cutting elements 46 are displaced radially from the longitudinal axis of the shaft 31 comprise projections directed from the end surface 43, as an example, about 0.050 inch, for engagement with the wall 21 of the pipe end portion 4. An inner circular portion or plateau 44 of the end surface 43 lies within the ring of cutting elements 46 for receipt of chips cut from the pipe end portion 4. The exemplary cutting elememts are Vee-shaped in cross section, FIGS. 3, 4 and 5, and have opposite, sloping, sidewalls 47 and 48 converging to form an elongate edge 49 most remotely spaced from the end surface 43.

Each cutting element 46 is spaced from an adjoining cutting element 46 by spaced, transverse following and cutting faces 50 and 51 forming Vee-shaped recesses 53 extending substantially to the end surface 43 for relief of chips 57 cut from the pipe wall 21. In the illustrated example, the cutting faces 51 slope outwardly from the end surface 43 in a direction opposite to the operational direction of screw cutter rotation. As further discussed below, such rotation of the screw cutter 5 cuts a ring-shaped depression or penetration through the pipe surface 20 and into the wall 21, during which cutting the converging sidewalls 47 and 48 push the pipe end portion 4 transversely in the direction of longitudinal movement of the screw cutter 5. This compresses the pipe end portion 4 against the opposed part of the sleeve member wall 6 and into snug, aligned engagement therewith.

In a preferred form, the cutting faces 51 slope about 60° away from the edge 49 and, consequently, the direction of cutter element rotation. However, this angle may be varied, the object being to provide a combination cutting and pushing action in conjunction with sharp cutting edges 54 at the intersection of the faces 51 with respective sidewalls 47 and 48. In other words, the rake angle configuration of the cutting edges is appropriately selected such that a limited cutting penetration rate is achieved under the experienced pressure range and travel speed along the pipe end surface 20. Thus, cutting elements 46 will have only a limited ability to cut into the pipe wall 21 while the rate of spiral advancement of the screw cutter 5 will exceed this ability, thereby producing simultaneous cutting penetration and transverse compressive deformation of the pipe end portion 4.

Connecting the rapid installation fitting for plain end pipe 1 with a pipe end portion 4 is extremely fast and simple and requires only appropriate local cleaning and deburring of the pipe, inserting the pipe end portion 4 into a sleeve section until the end edge 7 seats against the internal shoulder 14, and tightening the screw cutter 5 against the pipe end portion 4 until the head 37 seats against the end surface 29.

In the preferred ready-to-use position noted above, the cutting elements 46 are spaced outwardly of the pipe insertion path a distance sufficient to avoid interference with the pipe end upon receipt into the sleeve section, for example, a distance equivalent to approximately ½ turn. Using a wrench (not shown), the workman rotates and thereby spirally advances the screw cutter 5 said ½ turn, or 180°, until the ring of cutting elements 46 firmly engages the pipe outside surface 20. The workman continues to advance the screw cutter 5, desirably without pause, for approximately 1½ further turns, or 540°, thereby producing a total two complete turns to advance the cutting elements 46 into the pipe wall 21 and seat the head 37 against the external shoulder edge 29.

Figure 3:
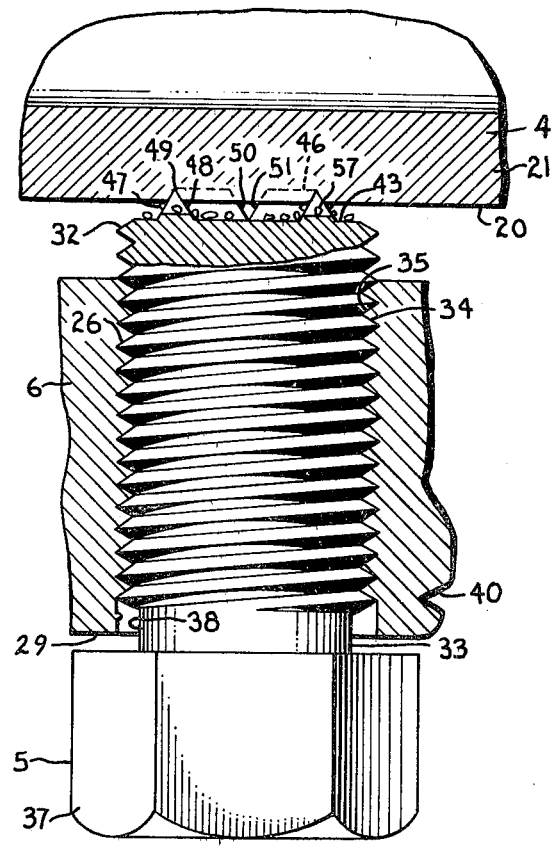
FIG. 3 is an enlarged, fragmentary cross-sectional view showing the screw cutter partly advanced into the pipe end portion.
Figure 4:
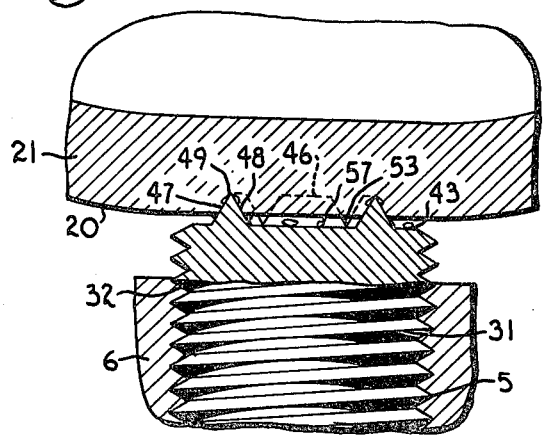
FIG. 4 is an enlarged, fragmentary cross-sectional view rotated 180° from FIG. 3 and showing the screw cutter in substantially full advancement toward and into the pipe end portion.
Figure 5:
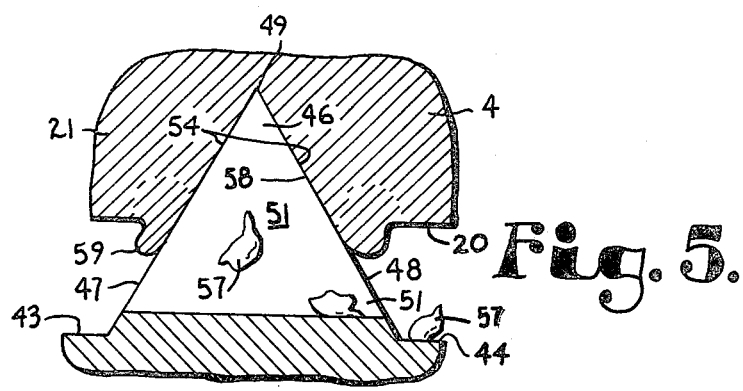
FIG. 5 is a fragmentary cross-sectional view, greatly enlarged, showing details of a cutting element or tooth penetrated into the surface of a plain end pipe.

As the cutting elements 46 contact the outer surface of the pipe end portion 4, FIGS. 3 and 5, the sharp edges 54 of the cutting faces 51 cuttingly penetrate or carve through the outside surface 20 and into the pipe wall 21, removing metal material therefrom and forming chips 57 which tend to accumulate in the area of the Vee-shaped recesses 53, the end surface 43, and the inner circular portion 44.

Rotation of the screw cutter 5 causes the interacting screw threads to move the cutting elements 46 forwardly faster than their ability to cut at the curvilinear speed thereof, thereby, simultaneously with the cutting, pushing the pipe wall 21 in the direction of advancement of the screw cutter 5. This deforms the pipe end portion 4 from a circular shape to a slightly oval shape while causing snug engagement within the respective sleeve sections 2 or 3. The pressure exerted by the cutting elements 46 may also plastically deform the pipe wall 21 at areas adjacent the cut groove 58, forming slight bulges 59 extending along the entrance thereof.

Figure 6:
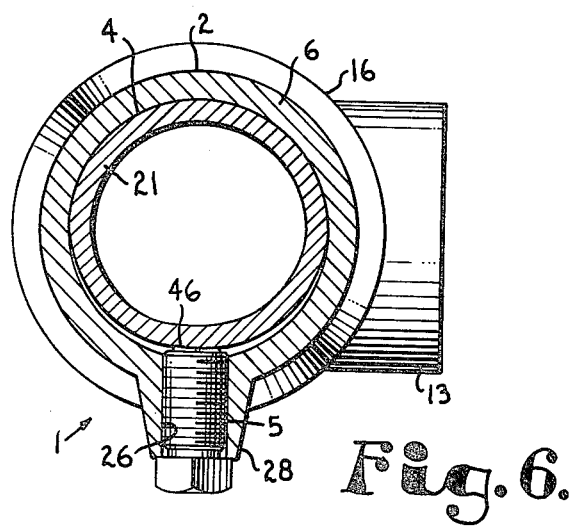
FIG. 6 is a cross-sectional view of the fitting taken along lines 6—6, FIG. 1, and showing a pipe end portion forcefully engaged in the fitting socket or sleeve.

The pipe end portion 4 thereby forceably engages the sleeve inner surface 8 for approximately 180° to 200° of the pipe outside surface 20, the remainder being spaced from the sleeve inner surface 8 by the pressure exerted by the screw cutter 5, FIG. 6. The substantial penetration of the screw cutter 5 into the pipe wall 21, for example, about 0.030 inch in the configuration noted above, together with the compression of the pipe end portion 4 within a respective sleeve section 2 or 3 prevents longitudinal separation and twisting of the pipe relative to the fitting 1 under high stress. Under conditions where the pipe material is softer or the cutter elements are somewhat more efficient, penetration may be obtained to the extent where the end surface 43, including the plateau 44, contacts the pipe surface and joins in the compression thereof.

It is to be understood that while certain forms of this invention have been illustrated and described, it is not to be limited to the specific forms or arrangement of parts herein described and shown, except insofar as such limitations are included in the following claims.

What I claim and desire to secure by Letters Patent is:

1. A pipe fitting comprising:
   (a) a wall defining a metal pipe end receiving socket with a pipe cradling interior surface,
   (b) a screw threaded bore extending through said wall and having an axis directed toward said interior surface,
   (c) a locking device comprising a shaft body having a head at one end and at least one cutter at the other end, said shaft body being externally screw threaded and engaged in said threaded bore,
   (d) said head being greater in diameter than said shaft body and adapted for rotating said shaft and thereby spirally advancing said cutter toward said interior surface, said wall forming a shoulder aligned with said head and forming a stop to limit the travel of said head toward said interior surface,
   (e) said cutter comprising a projection directed from said body other end toward said interior surface and having intersecting faces forming a metal cutting edge,
   (f) said cutting edge being spaced from the axis of said shaft and positioned in a cutting attitude when spirally advanced toward said interior surface,
   (g) said cutting edge having a rake angle configuration such that a limited cutting penetration rate is achieved under a predetermined pressure range and travel speed along a pipe end surface,
   (h) the thread pitch of said bore and shaft being such that said cutting edge, upon rotation of said shaft in said bore, advances at a rate greater than said cutting penetration rate such that said pipe is deformed and urged against said socket interior surface at a location generally diametrically opposite said cutter, whereby said projection cuttingly penetrates into the pipe surface simultaneously with urging the pipe into cradling contact with said socket interior surface, thus firmly locking the pipe end in said fitting, and
   (i) the positioning of said stop being such as to allow said cutter to partially penetrate the pipe but preventing said cutter from passing through the pipe.

2. The pipe fitting as set forth in claim 1 wherein:
   (a) said locking device has a plurality of cutters similar to said one cutter and respectively positioned in spaced relation circumferentially about said shaft axis,
   (b) said metal cutter has a generally broad base portion and a pair of side portions converging to form a generally narrow upper portion,
   (c) said upper portion forming the point of greatest projection from said body other end, and
   (d) said bore is positioned so as to be generally radial with respect to the pipe when said cutter is engaging the pipe.

3. The pipe fitting as set forth in claim 1 including:
   (a) a resilient ring seal in said socket and positioned for engaging the pipe end to effect a seal between said socket and the pipe.

4. A fitting for connection to a pipe end to form a joint therewith comprising:
   (a) a generally cylindrical wall forming a sleeve section sized to receive said pipe end,
   (b) a generally cylindrical cutter member extensible into said sleeve section and having cutting elements thereon displaced radially from the longitudinal axis of said cutter member having a cutting edge with a rake angle associated therewith for rotary cutting engagement with the pipe end,
   (c) screw thread means advancing said cutter member into cutting engagement with the surface of the pipe end portion and simultaneously effecting sufficient rotation of said cutter member about said longitudinal axis to produce a complete ring shaped penetration into said pipe end surface, said rake angle being such as to make said cutting member inefficient such that said screw thread means advances said cutter member faster than the ability of said cutting elements to cut such that said pipe is urged away from said cutter without substantial collapse of said cutter member, thereby simultaneously cutting and pushing the pipe end portion into snug engagement with said sleeve section opposite said cutter member during full advancement of said cutter member while said cutter member penetrates the pipe end, and
   (d) stop means associated with said cutter member and said sleeve section limiting the extent of said penetration.

5. The fitting set forth in claim 4 including:
(a) a seal in said sleeve section for engaging the pipe end and effecting a liquid-tight connection between the pipe end and sleeve.

6. The fitting set forth in claim 4 wherein:
(a) said sleeve section includes an abutment member limiting intrusion of said pipe end portion into the fitting.

7. The fitting as set forth in claim 4 including:
(a) a second said sleeve section for receipt of a second pipe end, and (b) an inner section dividing said sleeve sections and having a tubular passage communicating between said sleeve sections.

8. The fitting set forth in claim 4 wherein:
(a) said thread means includes screw threads spaced approximately 20 per inch for advancing said cutter member longitudinally about 1/20th inch for each 360° of rotation.

9. The fitting set forth in claim 4 wherein:
(a) said cutting elements are respectively circumferentially spaced apart for receipt therebetween of chips cut from the pipe end portion.

* * * * *